United States Patent [19]

Kaesler et al.

[11] Patent Number: 4,983,686

[45] Date of Patent: * Jan. 8, 1991

[54] CHEMICAL MODIFICATION OF POLYACRYLAMIDE AND POLYACRYLIC ACIDS/ACRYLAMIDE GELS

[75] Inventors: Ralph W. Kaesler, Barrington; Dodd W. Fong, Naperville, both of Ill.

[73] Assignee: Nalco Chemical Company, Naperville, Ill.

[*] Notice: The portion of the term of this patent subsequent to Oct. 27, 2004 has been disclaimed.

[21] Appl. No.: 3,349

[22] Filed: Jan. 14, 1987

[51] Int. Cl.$^5$ ................................................ C08F 8/34
[52] U.S. Cl. .................................. 525/351; 525/329.4
[58] Field of Search .......................................... 525/351

[56] References Cited

U.S. PATENT DOCUMENTS 4,525,562  6/1985  Patel ..................................... 526/271

Primary Examiner—Christopher Henderson
Attorney, Agent, or Firm—John G. Premo; Donald G. Epple

[57] ABSTRACT

Acrylamide terpolymers which contain from 1–40 mole percent of acrylamido $C_1$–$C_3$ alkyl of $C_1$–$C_3$ hydroxy alkyl sulfonates may be prepared by using as the starting material aqueous acrylamide polymer gels.

2 Claims, No Drawings

CHEMICAL MODIFICATION OF POLYACRYLAMIDE AND POLYACRYLIC ACIDS/ACRYLAMIDE GELS

INTRODUCTION

The present invention is directed to the preparation of acrylamide terpolymers which contain from 10–95 mole percent of acrylamide, from 1–70 mole percent of acrylic acid and from 1–40 mole percent of an acrylamido $C_1$–$C_3$ alkyl sulfonate or an acrylamido hydroxy substituted $C_2$–$C_3$ alkyl sulfonate. These terpolymers are prepared by reacting acrylamide polymer gels with certain amino $C_2$–$C_3$ alkyl sulfonate, an amino hydroxy substituted $C_2$–$C_3$ alkyl sulfonate or sodium formaldehyde bisulfite. When reacted under the conditions hereafter specified, polymers of the above type are produced.

One of the major advantages of the invention is that acrylamide polymers, which will be more fully described hereafter, are often produced by solution polymerization. This method often produces concentrated polymer gels which are then subjected to conventional drying and grinding procedures to produce dry polymer particles.

To conduct reactions capable of producing terpolymers of the type described above, it has been customary to form dilute solutions of the acrylamide polymers, conduct the reactions and then to subsequently dry the reacted polymers. The present invention allows the utilization of the acrylamide polymer gels which result from solution homopolymerization of acrylamide or its copolymerization with acrylic acid.

THE INVENTION

The invention resides in a method of preparing an acrylamide terpolymer which contains from 10–95 mole percent of acrylamide, from 1–70 mole percent of acrylic acid and from 1–40 mole percent of an acrylamido $C_1$–$C_3$ alkyl sulfonate or an acrylamido hydroxy substituted $C_2$–$C_3$ alkyl sulfonate which comprises:

a. Reacting as the reactants an acrylamide polymer which is in the form of a 10–40 percent weight percent aqueous solution having a water to acrylamide polymer ratio of at least 1 and which contains at least 10 mole percent of acrylamide with from 1–40 mole percent of an amino $C_2$–$C_3$ alkyl sulfonate, an amino hydroxy substituted $C_2$–$C_3$ alkyl sulfonate or sodium formaldehyde bisulfite;

b. Heating the reactants to a temperature of at least 130° C. under autogenous pressure for a period of time to produce the acrylamide terpolymer; and then, c. Recovering the acrylamide terpolymer.

THE STARTING ACRYLAMIDE POLYMERS

The starting acrylamide polymers are readily produced by solution polymerization utilizing free radical catalysts. Acrylamide polymers, as the term is used herein, includes polymers consisting entirely of acrylamide units as well as copolymers of acrylamide which contain from 10–98 mole percent of acrylamide and with the remainder being acrylic acid either as the free acid or as one of its water-soluble salts, e.g. sodium, potassium or ammonium.

The invention, in a preferred embodiment, contemplates acting upon these acrylamide polymers when they are of relatively high molecular weight. Outstanding flocculants, coagulants and the like are afforded when the starting polymers have high reduced specific viscosities (RSV). In the case of homopolymers of acrylamide, good results are achieved when the RSV is within the range of 18–24. In the case of acrylamide acrylic acid copolymers, good results are obtained when the RSV is within the range of 31–32.

It is understood that the method of the invention can be applied to any acrylamide polymers although such polymers should, at a minimum, have a molecular weight of 500,000.

The coniditions under which the acrylamide polymers are converted to terpolymers and which are described hereafter tend to convert a portion of the amide groups present in the starting polymer to acrylic acid groups. Thus in all instances, whether the polymer is an acrylamide polymer or copolymer of acrylamide and acrylic acid, the finished polymer will be a terpolymer.

THE AMINO SULFONATES

The amino sulfonate may be selected from any number of amino alkyl sulfonic acids. Preferred amino alkyl sulfonates are taurine and 3-amino-2-hydroxy propane sulfonic acid and their sodium salts. They are reacted with the acrylamide polymers in an amount equal to about 1–40 mole percent. The amino methyl sulfonates are prepared using as the starting reactant sodium formaldehyde bisulfite adduct which may be used as such or its precursors may be used, e.g. formaldehyde and sodium bisulfite.

THE ACRYLAMIDE POLYMER GELS

As indicated, the invention utilizes the acrylamide polymers in their gel form which may be either produced by dissolving a dry acrylamide polymer into water or to utilize an acrylamide polymer in its gel form which results from the production of the acrylamide polymer by solution polymerization.

One of the surprising features of the invention is that the amino alkyl sulfonic acids or the sodium formaldehyde bisulfite, are capable of reacting with these gels to produce the terpolymers in high yield.

To prevent the formation of insoluble gel during the process, a certain weight ratio of water to polymer in the gel reaction mixture is required. This ratio should be equal to at least 1.0. Preferably, it is at least 3.0. In some cases in particular reactions with sodium taurate, the formation of insoluble gel can be prevented by conducting the gel modification in the presence of isopropanol, approximately 3% based on the total reaction mixture.

THE REACTION CONDITIONS

The reaction described above is conducted at a minimum temperature of 130° in a pressurized reactor under conditions of autogenous pressure. A typical reaction time may vary between 3–6 hours depending upon the reaction temperature and the particular ingredients reacted. While 130° C. is considered to be a minimum reaction temperature, an appropriate reaction temperature range is 140°–175° C., with a preferred reaction temperature range being 145°–155°.

A typical reaction of sodium taurate with a PAM gel would be performed as follows:

Dry PAM (~90 weight percent) is swollen or PAM gel (~30 weight percent) is wetted with an aqueous solution of sodium 2-aminoethane sulfonate (10 mole percent). This is then heated inside a closed pressure vessel at 150° C. for three hours. The final terpolymer can be dissolved and used directly or processed to give a dry polymer.

To illustrate the advantage of the invention, Table I is presented below:

TABLE I

| Polymer No. | Starting Polymer | Modifying Reagent (MOL %) | Initial Reaction Mixture | | Reaction Conditions | | Product Composition | | |
|---|---|---|---|---|---|---|---|---|---|
| | | | Wt. % Polymer | W/P[1] | Temperature | Time (hrs.) | $SO_3^-/COO^-/CONH_2$[5] (MOL %) | RSV | Wt % Dried Polymer |
| 1 | PAM[2] | 10-NaTau[3] | 20.3 | 3.7 | 134–145 | 3.0 | 3.6/21.6/74.8 | 35 | 81.0 |
| 2 | PAM | 10-NaTau | 21.4 | 3.3 | 155–163 | 3.0 | 8.6/32.1/59.3 | 33 | 84.5 |
| 3 | PAM | 40-NaTau | 18.9 | 3.3 | 147–155 | 5.5 | 20.3/43.0/36.7 | 33 | 65.0 |
| 4 | PAM | 10-Tau[3] | 22.5 | 3.3 | 143–145 | 3.5 | 2.2/3.2/94.6 | 23 | 79.0 |
| 5 | PAM | 10-Tau | 21.6 | 3.3 | 155 | 3.0 | 8.6/15.6/75.8 | 26 | 86.5 |
| 6 | PAA/AM[4] | 10-NaTau | 21.6 | 3.3 | 153 | 3.25 | 7.9/38.8/53.3 | 29 | 83.4 |
| 7 | PAM | 20-HOCH$_2$SO$_3$Na 50-Na$_2$SO$_3$ | 18.7 | 3.1 | 144–149 | 3.0 | 3.2/34.1/62.7 | 33 | 41.6 |

[1]W/P = Weight of water/weight of polymer
[2]Commercial polymer (RSV = 18–24)
[3]NaTau = sodium taurate
Tau = taurine
[4]30 mol % AA
[5]The polymer composition was determined by colloid titrations

Having thus described our invention, we claim:

1. A method of preparing an acrylamide terpolymer which contains from 10–95 mole percent of acrylamide, from 1–70 mole percent of acrylic acid and from 1–40 mole percent of an acrylamido $C_2$–$C_3$ alkyl sulfonate which comprises:

a. Reacting as the reactants an acrylamide polymers which is in the form of a 10–40 percent weight percent aqueous gel having a water to acrylamide polymer ratio of at least 1 and which contains at least 10 mole percent of acrylamide and from 1–40 mole percent of an amino $C_2$–$C_3$ alkyl sulfonate;

b. Heating the reactants to a temperature of at least 130° C. under autogenous pressure for a period of time to produce the acrylamide terpolymer; and then, c. Recovering the acrylamide terpolymer.

2. The method of claim 1 where the $C_2$–$C_3$ alkyl sulfonate is taurine or its sodium salt.

* * * * *